(12) United States Patent
Noh et al.

(10) Patent No.: US 11,949,508 B2
(45) Date of Patent: *Apr. 2, 2024

(54) METHOD AND APPARATUS FOR CONFIGURING PUNCTURING PATTERNS IN WIRELESS COMMUNICATION SYSTEM

(71) Applicant: Senscomm Semiconductor Co., Ltd., Suzhou (CN)

(72) Inventors: Yujin Noh, Irvine, CA (US); Seung Hyeok Ahn, Irvine, CA (US); Seung Ho Choo, Suzhou (CN); Young-Hwan Kang, Pyeongtaek-si (KR); Jungchul Shin, Seoul (KR); Tan Joong Park, Seoul (KR)

(73) Assignee: Senscomm Semiconductor Co., Ltd., Suzhou (CN)

( * ) Notice: Subject to any disclaimer, the term of this patent is extended or adjusted under 35 U.S.C. 154(b) by 91 days.

This patent is subject to a terminal disclaimer.

(21) Appl. No.: 17/675,478

(22) Filed: Feb. 18, 2022

(65) Prior Publication Data

US 2022/0345243 A1 Oct. 27, 2022

Related U.S. Application Data

(60) Provisional application No. 63/223,675, filed on Jul. 20, 2021, provisional application No. 63/177,492, filed on Apr. 21, 2021, provisional application No. 63/174,912, filed on Apr. 14, 2021.

(51) Int. Cl.
*H04L 1/00* (2006.01)
*H04L 1/16* (2023.01)
*H04L 1/1607* (2023.01)
*H04L 5/00* (2006.01)
*H04W 84/02* (2009.01)
*H04W 84/12* (2009.01)

(52) U.S. Cl.
CPC .......... *H04L 1/0069* (2013.01); *H04L 1/0013* (2013.01); *H04L 1/1614* (2013.01); *H04L 5/0044* (2013.01); *H04W 84/02* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2017/0134043 A1* | 5/2017 | Lee | H03M 13/6362 |
| 2019/0141570 A1* | 5/2019 | Verma | H04W 28/065 |
| 2022/0030572 A1 | 1/2022 | Shellhammer et al. | |

OTHER PUBLICATIONS

Office Action for CN202210111209.X by China National Intellectual Property Administration dated Jan. 21, 2024.

* cited by examiner

*Primary Examiner* — Yemane Mesfin
*Assistant Examiner* — Jeff Banthrongsack
(74) *Attorney, Agent, or Firm* — BROADVIEW IP LAW, PC

(57) ABSTRACT

A method performed by a transmitter in a wireless local area network (WLAN) is provided. The method comprises: setting a second parameter in a second frame based on a first puncturing pattern indicated by a first parameter in a first frame for a basic service set (BSS) set up by an access point (AP); and transmitting, to a receiver, the second frame, wherein the first puncturing pattern is one of a plurality of puncturing patterns pre-determined for a third parameter in a third frame.

16 Claims, 10 Drawing Sheets

(a)

(b)

(a)

(b)

HE SU PPDU format (a)

HE MU PPDU format (b)

HE ER SU PPDU format (c)

HE TB PPDU format (d)

METHOD AND APPARATUS FOR CONFIGURING PUNCTURING PATTERNS IN WIRELESS COMMUNICATION SYSTEM

CROSS REFERENCE TO PRIOR APPLICATIONS

The present application claims, under 35 U.S.C. § 119, priority to U.S. Provisional Patent Application No. 63/174,912 (filed on Apr. 14, 2021), U.S. Provisional Patent Application No. 63/177,492 (filed on Apr. 21, 2021), and U.S. Provisional Patent Application No. 63/223,675 (filed on Jul. 20, 2021), which are all hereby incorporated by reference in their entirety.

BACKGROUND

The present disclosure relates to a method and apparatus for configuring puncturing patterns in a wireless communication system.

Wi-Fi is a Wireless Local Area Network (WLAN) technology that allows devices to access the Internet in the different frequency bands such as 2.4 GHz, 5 GHz, 6 GHz or 60 GHz frequency bands.

WLANs are based on the Institute of Electrical and Electronic Engineers (IEEE) 802.11 standard. The Wireless Next Generation Standing Committee (WNG SC) of IEEE 802.11 is an ad hoc committee that considers the next generation WLAN in the medium to long term.

The legacy IEEE 802.11a/b/g/n/ac does not guarantee communication stability in dense environments with many users. In order to overcome this limit, the IEEE 802.11ax as the WLAN system supporting High Efficiency (HE) has been developed. The IEEE 802.11ax aims to improve system throughput in dense environments.

Recently, there is a need for a new WLAN system to support maximum data throughput than the data throughput supported by IEEE 802.11ax.

IEEE 802.11be also known as Extremely High Throughput (EHT) WLAN is built upon 802.11ax, focusing on extremely high speed and extremely low latency for the wireless communication service such as 4k and 8k video streaming, virtual reality/augmented reality (VR/AR), etc.

The scope of IEEE 802.11be, often discussed in the next-generation WLAN task group, also known as IEEE 802.11be or Extremely High Throughput (EHT) WLAN, includes: 1) 320 MHz bandwidth and more efficient utilization of non-contiguous spectrum, 2) muitiple RU (MRU) operation 3) Multi-band/multi-channel aggregation and operation(also referred to multiple link operation (MLO)), 4) 16 spatial streams and Multiple Input Multiple Output (MIMO) protocols enhancements, 5) Multi-Access Point (AP) Coordination (e.g. coordinated and joint transmission), 6) Enhanced link adaptation and retransmission protocol (e.g. Hybrid Automatic Repeat Request (HARQ)), 7) if needed, adaptation to regulatory rules specific to 6 GHz spectrum, 8) Integrating Time-Sensitive Networking (TSN) extensions for low-latency real-time traffic (IEEE 802.11aa).

SUMMARY

In one embodiment, a method performed by a transmitter in a wireless local area network (WLAN) is provided. The method comprises: setting a second parameter in a second frame based on a first puncturing pattern indicated by a first parameter in a first frame for a basic service set (BSS) set up by an access point (AP); and transmitting, to a receiver, the second frame, wherein the first puncturing pattern is one of a plurality of puncturing patterns pre-determined for a third parameter in a third frame.

In another embodiment, a transmitter in a wireless local area network (WLAN) is provided. The transmitter comprises: a transceiver; and a processor configured to: set a second parameter in a second frame based on a first puncturing pattern indicated by a first parameter in a first frame for a basic service set (BSS) set up by an access point (AP); and control the transceiver to transmit, to a receiver, the second frame, wherein the first puncturing pattern is one of a plurality of puncturing patterns pre-determined for a third parameter in a third frame.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
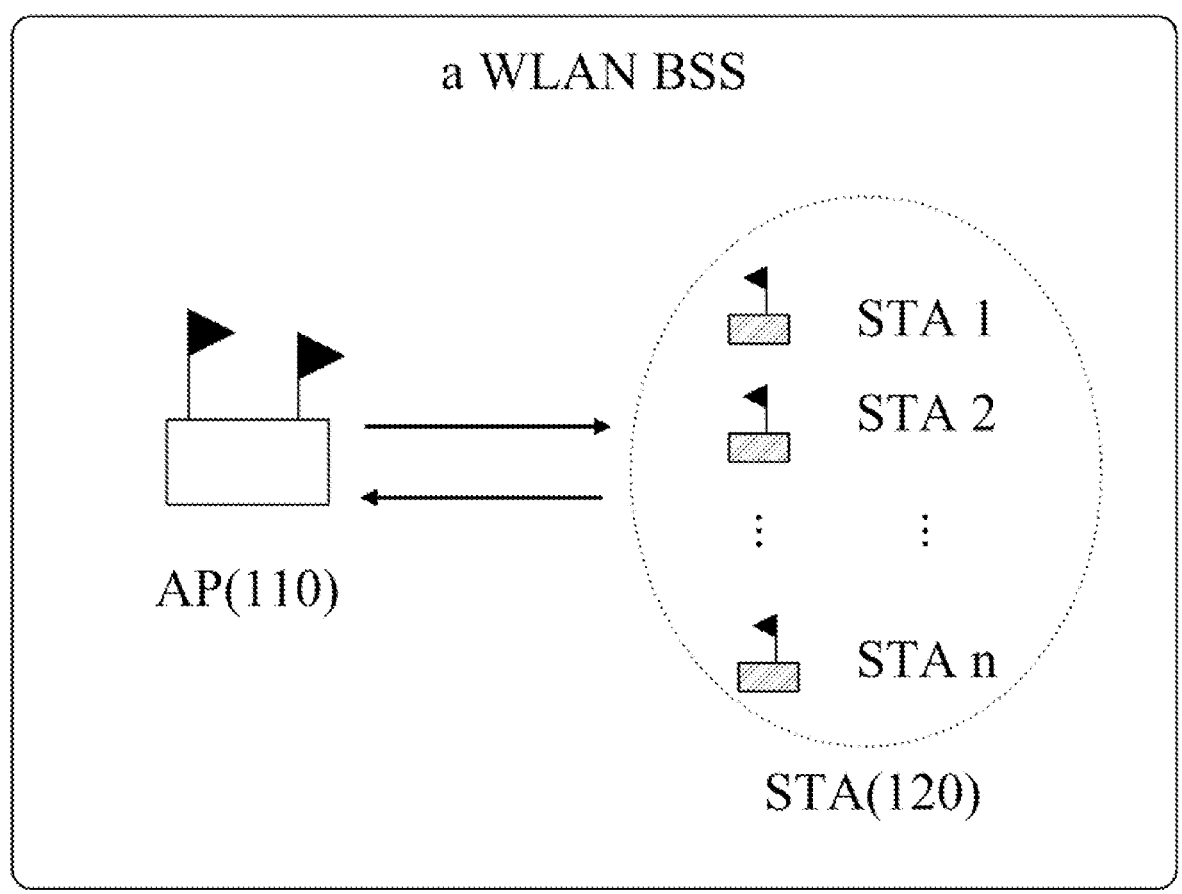
FIG. 1 illustrates an example BSS in a WLAN according to an embodiment of the present disclosure.

The following detailed description of the embodiments of the present disclosure is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the present disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The following detailed description of the embodiments of the present disclosure applies to a wireless local area network (WLAN). The following description may apply to the next generation WLAN method (IEEE 802.11be) or the like. The IEEE 802.11be maintains compatibility with the conventional IEEE 802.11a/b/g/n/ac/ax (Hereinafter referred to as "11a/b/g/n/ac/ax"). The following description may be executed in the IEEE 802.11be (Hereinafter referred to as "11be") environment, and also maintains compatibility with the conventional 11a/b/g/n/ac/ax.

In a WLAN, a single basic service set (BSS) is composed of two kinds of entity which are a single AP Station (STA) and a plurality of non-AP STAs. STAs share a same radio frequency channel with one out of WLAN operation bandwidth options (e.g., 20/40/80/160/320 MHz). Here, AP STA and non-AP STA could be referred as AP and STA, respectively.

WLAN has included operation of multiple users' frame transmissions and receptions simultaneously wherein frame exchanges are scheduled under the specific rule within a BSS. Here multi-user (MU) transmission means that the frames in a certain BSS are transmitted to (e.g., downlink (DL) MU) or from (e.g., uplink (UL) MU) a plurality of STAs simultaneously based on different resources. For example, different resources could be different frequency resources in orthogonal frequency division multiplexing access (OFDMA) transmission or different spatial streams in multi MU-multiple input multiple output (MIMO) transmission with DL-OFDMA, DL-MU-MIMO, UL-OFDMA, and UL-MU-MIMO of MU transmission as shown in FIG. 1 below.

FIG. 1 illustrates an example BSS in a WLAN according to an embodiment of the present disclosure.

Referring to FIG. 1, a WLAN BSS 100 may include a one AP 110 and a plurality of STAs 120. Any one of the plurality of STAs 120 may receive resource allocated for MU transmission and communicate with the AP 110. The AP 110 may deliver information regarding the resource allocation for MU transmission to any one of the plurality of STAs 120. The plurality of STAs 120 may receive/transmit, from/to the AP 110, the frames simultaneously in the WLAN BSS 100 based on the allocated resources for MU transmission.

Figure 2A:
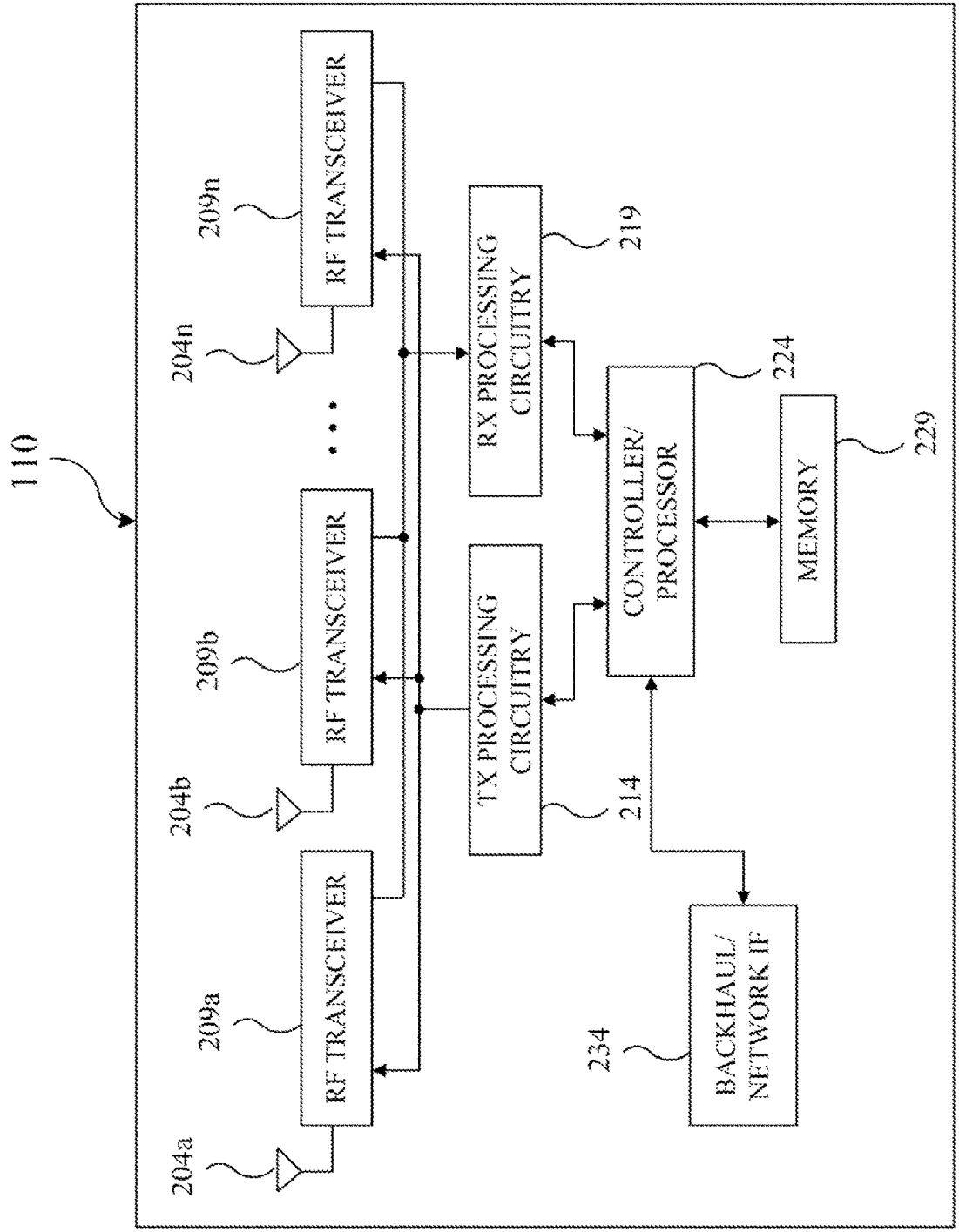
FIG. 2A illustrates an example AP 110 according to an embodiment of the present disclosure.

FIG. 2A illustrates an example AP 110 according to an embodiment of the present disclosure. The embodiment of the AP 110 illustrated in FIG. 2A is for illustration only, and the AP 110 of FIG. 1 could have the same or similar configuration. However, APs come in a wide variety of configurations, and FIG. 2A does not limit the scope of the present disclosure to any particular implementation of an AP.

As shown in FIG. 2A, the AP 110 includes multiple antennas 204 a-204 n, multiple RF transceivers 209 a-209 n, transmit (TX) processing circuitry 214, and receive (RX) processing circuitry 219. The AP 110 also includes a controller/processor 224, a memory 229, and a backhaul or network interface 234.

The RF transceivers 209 a-209 n receive, from the antennas 204 a-204 n, incoming RF signals, such as signals transmitted by STAs in the WLAN BSS 100. The RF transceivers 209 a-209 n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209 a-209 n receive the outgoing processed baseband or IF signals from the TX processing circuitry 214 and up-converts the baseband or IF signals to RF signals that are transmitted via the antennas 204 a-204 n.

The controller/processor 224 can include one or more processors or other processing devices that control the overall operation of the AP 110. For example, the controller/processor 224 could control the reception of forward channel signals and the transmission of reverse channel signals by the RF transceivers 209 a-209 n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204 a-204 n are weighted differently to effectively steer the outgoing signals in a desired direction. The controller/processor 224 could also support OFDMA operations in which outgoing signals are assigned to different subsets of subcarriers for different recipients (e.g., different STAs). Any of a wide variety of other functions could be supported in the AP 110 by the controller/processor 224 including a combination of DL MU-MIMO and OFDMA in the same transmit opportunity. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 110 to communicate with other devices or systems over a backhaul connection or over a network. The interface 234 could support communications over any suitable wired or wireless connection(s). For example, the interface 234 could allow the AP 110 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 110 may include circuitry and/or programming for management of channel sounding procedures in WLANs. Although FIG. 2A illustrates one example of AP 101, various changes may be made to FIG. 2A. For example, the AP 110 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 110 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
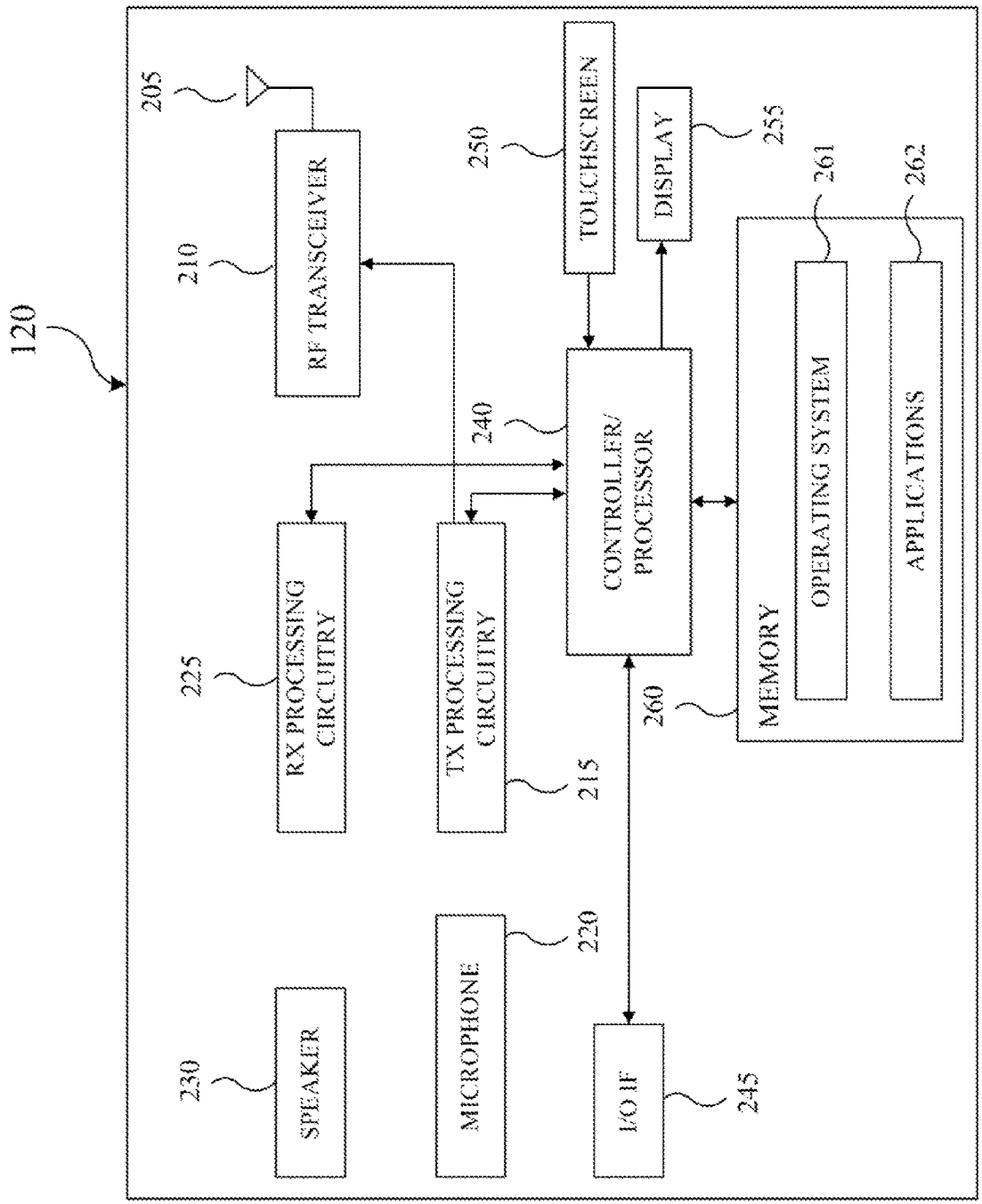
FIG. 2B illustrates an example STA 120 according to an embodiment of the present disclosure.

FIG. 2B illustrates an example STA 121 according to an embodiment of the present disclosure. The embodiment of the STA 121 illustrated in FIG. 2B is for illustration only, and the STAs 120 of FIG. 1 could have the same or similar configuration. However, STAs come in a wide variety of configurations, and FIG. 2B does not limit the scope of the present disclosure to any particular implementation of a STA.

As shown in FIG. 2B, the STA 121 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the WLAN BSS 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 120. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide management of channel sounding procedures in WLANs. In some embodiments, the controller/processor 240 includes at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet (NDP) Announcement frame and NDP frame and transmitting the beamforming feedback report in response to a Trigger frame. The controller/processor 240 can operate the plurality of applications 262 based on the OS program 261 or in response to a signal received from an AP. The main controller/processor 240 is also coupled to the I/O interface 245, which provides STA 120 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 120 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 120, various changes may be made to FIG. 2B. For example, various components in FIG. 2B could be combined, further subdivided, or omitted and additional components could be added according to particular needs. In particular examples, the STA 120 may include any number of antenna(s) 205 for MIMO communication with an AP 110. In another example, the STA 120 may not include voice communication or the controller/processor 240 could be divided into multiple processors, such as one or more central processing units (CPUs) and one or more graphics processing units (GPUs). Also, while FIG. 2B illustrates the STA 120 configured as a mobile telephone or smartphone, STAs could be configured to operate as other types of mobile or stationary devices.

Multi-user access modulation, for example, OFDMA for uplink and downlink has been introduced since High Efficiency (HE) WLAN, 11ax and after such future amendments such as extreme high throughput (EHT), and one or more STAs are allowed to use one or more resource units (RUs) throughout operation bandwidth and transmit at the same time. One RU is the minimum granularity which can be assigned and has decades of subcarriers in OFDM modulation symbol. Here, STAs could be associated or non-associated with AP when responding simultaneously in the assigned RUs within a specific period (e.g., SIFS, short inter frame space) as shown in FIG. 3 below.

Figure 3:
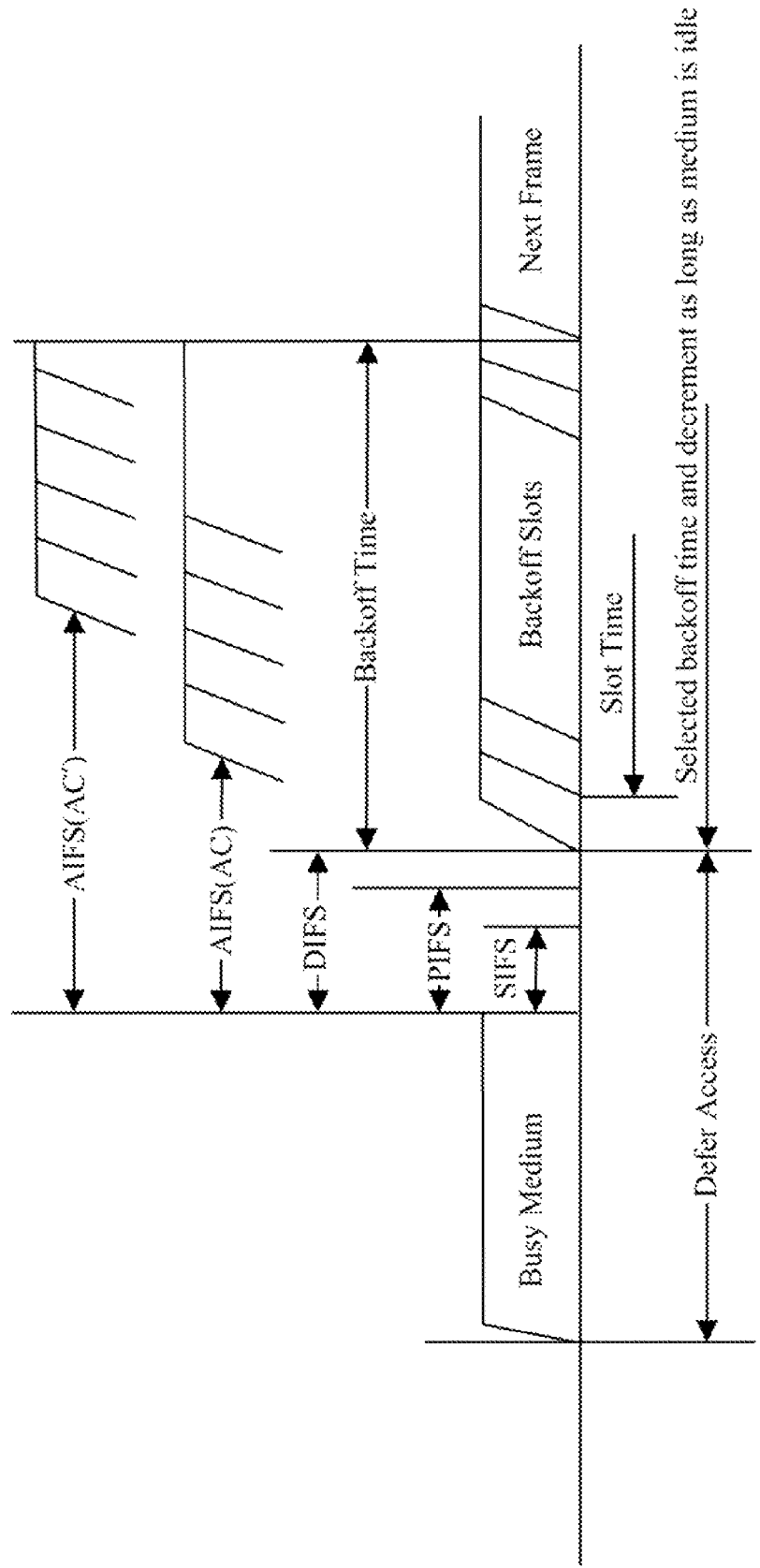
FIG. 3 illustrates different types of IFS in a WLAN according to an embodiment of the present disclosure.

FIG. 3 illustrates different types of IFS in a WLAN according to an embodiment of the present disclosure.

Referring to FIG. 3, inter frame space (IFS) is waiting periods between transmission of frames operating in the medium access control (MAC) sublayer where carrier-sense multi access/collision avoidance (CSMA/CA) is used. For example, IFS is the time period between completion of the transmission of the last frame and starting transmission of the next frame apart from the variable back-off period. The IEEE 802.11 standard defines various types of IFS such as short IFS (SIFS), point coordination function (PCF) IFS (PIFS), distributed coordination function (DCF) IFS (DIFS), and arbitration IFS (AIFS) to provide priority levels for access to wireless media. The relationship between the different IFS is illustrated in FIG. 3. SIFS is used for an acknowledgement (ACK) and for a ready to send (RTS) frame and clear to send (CTS) frame based high priority transmission. For example, if the control frame is a response frame of a previous frame, the WLAN device transmits the control frame without performing backoff if a SIFS has elapsed. PIFS is used in contention-free period (CFP) in PCF mode. For example, after the PIFS has elapsed, STAs having data to be transmitted in contention free period cand be initiated. DIFS is used for contention-based services/applications. For example, using DCF mode, a STA needs to sense the status of the wireless channel before the STA can place its request to transmit a frame. AIFS is used by quality of service (QoS) STAs to transmit all data frames management frames (e,g., MAC management protocol data units (MMPDUs)) and control frames (e.g., power save-poll (PS-Poll), RTS, CTS).

OFDMA is an OFDM-based multiple access scheme where different subsets of subcarriers are allocated to different users, allowing simultaneous data transmission to or from one or more users with high accurate synchronization for frequency orthogonality.

Figure 4:
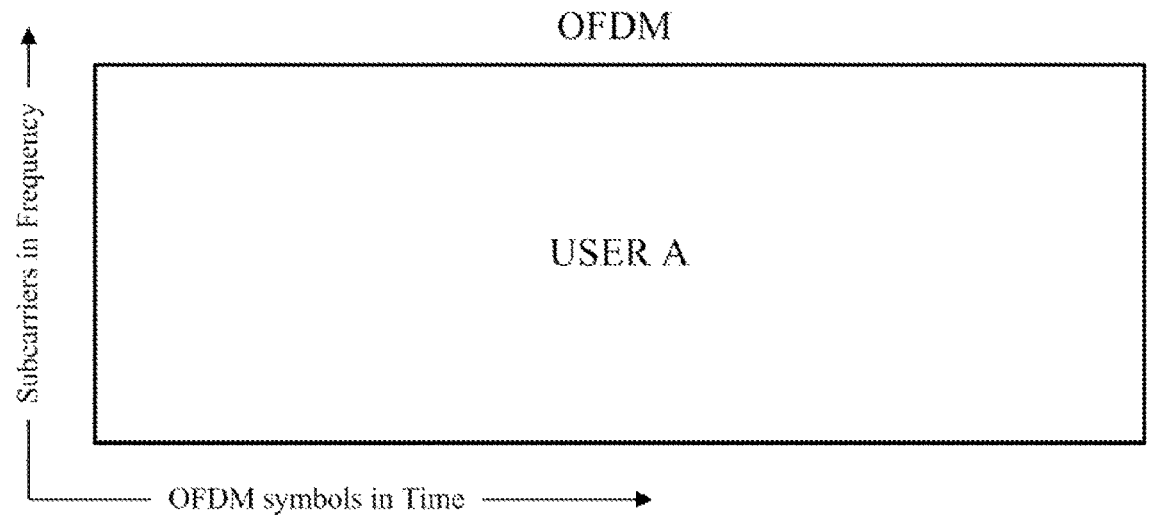
FIG. 4 illustrates difference between OFDM and OFDMA according to an embodiment of the present disclosure.
Figure 4:
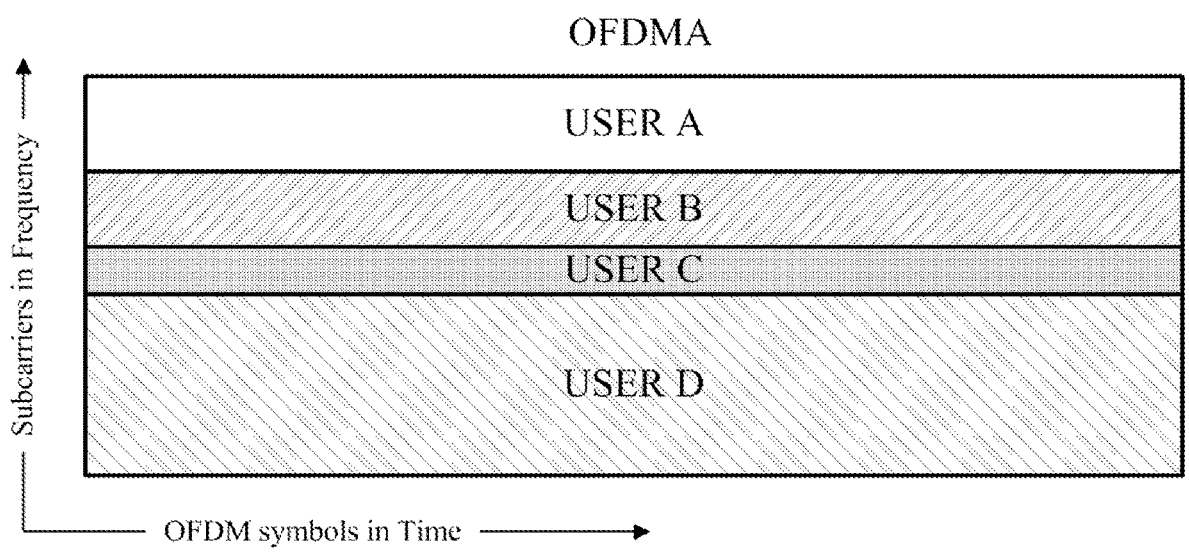

FIG. 4 illustrates difference between OFDM and OFDMA according to an embodiment of the present disclosure.

Referring to FIG. 4, in OFDM, a single user (e.g., USER A) is allocated whole subcarriers, while, in OFDMA, a plurality of users(e.g., USER A, USER B, USER C, and USER D) are allocated different subsets of subcarriers which can change from one PPDU to the next. In OFDMA, an OFDM symbol is constructed of subcarriers, the number of which is a function of the PPDU bandwidth.

In case of UL MU transmission, given different STAs with its own capabilities and features, AP may want to have more control mechanism of the medium by using more scheduled access, which may allow more frequent use of OFDMA/MU-MIMO transmissions. PPDUs in UL MU transmission (MU-MIMO or OFDMA) are sent as a response to the Trigger frame sent by the AP. Here, UL MU transmission consists of response frames (e.g., HE (or EHT) trigger-based (TB) PPDU) to a Trigger frame sent by the AP wherein the Trigger frame is supposed to have enough STA's information and assigned RUs. This allows specific STA to transmit the OFDMA based packet format with HE (or EHT) TB PPDU wherein HE (or EHT) TB PPDU is segmented into RU and all RUs as a response of Trigger frame are allocated to the selected non-AP STAs accordingly.

Figure 5:
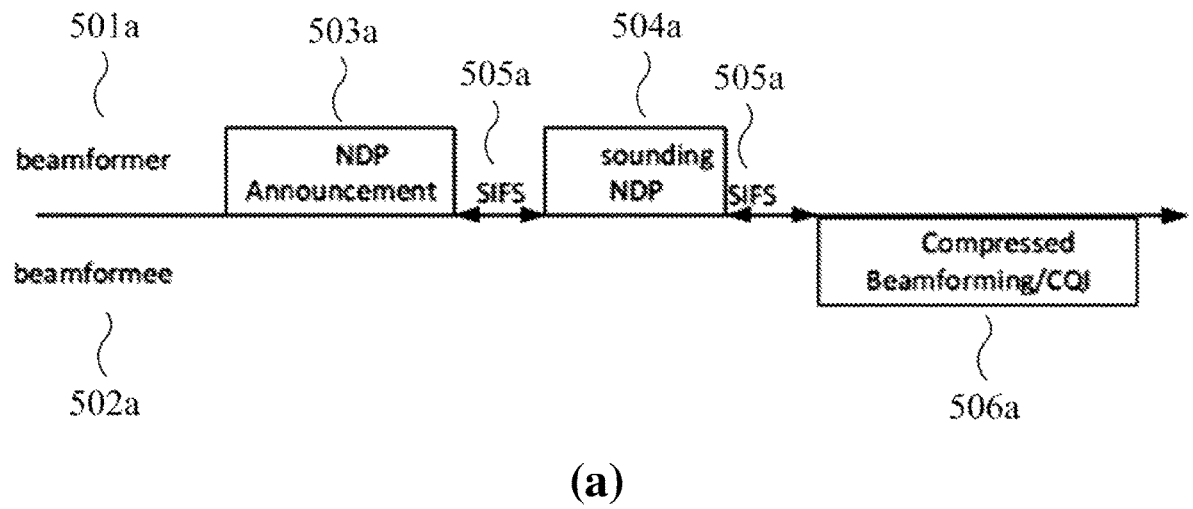
FIG. 5 illustrates a sounding protocol sequence according to an embodiment of the present disclosure.
Figure 5:
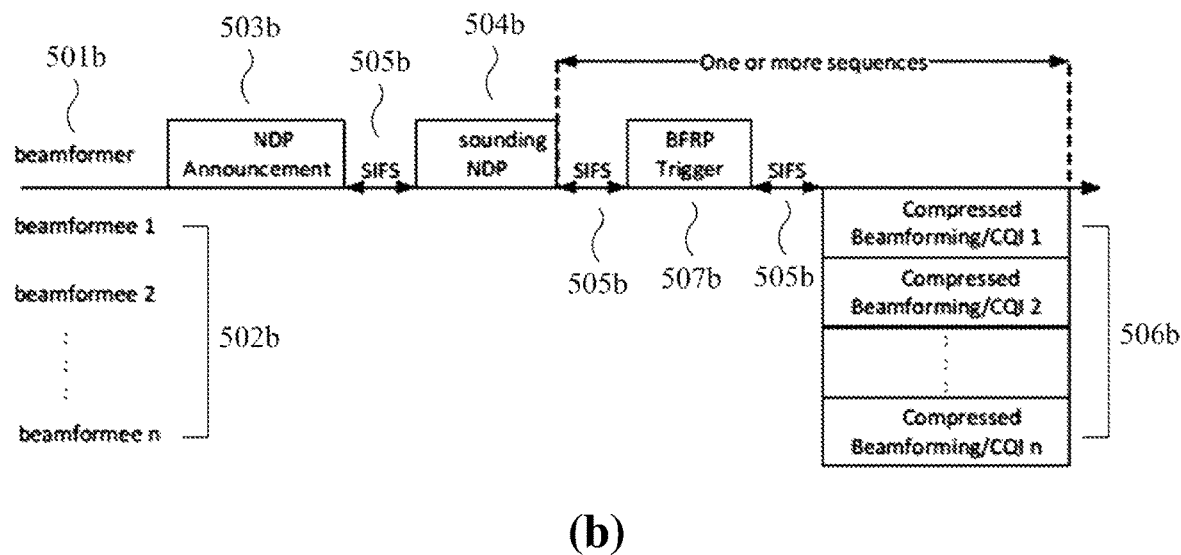

In WLAN, there is a sounding protocol sequence as defined with the frame exchange sequences for non-TB sounding sequence and TB sounding sequence as shown in FIG. 5 below.

FIG. 5 illustrates a sounding protocol sequence according to an embodiment of the present disclosure. A (a) of FIG. 5 is an example of a non-TB sounding sequence and a (b) of FIG. 5 is an example of a TB sounding sequence.

Referring to (a) of FIG. 5, the beamformed transmission is initiated with a NDP Announcement frame 503a by the beamformer 501a. After SIFS 505a interval, the NDP frame 504a is transmitted to be estimated for channel matrix by for the beamformee 502a and beamformee 502a calculates the beam matrix. After SIFS 505a interval, Compressed Beamforming/channel quality indicator (CQI) frame 506a including feedback information is sent by the beamformee 502a. NDP Announcement frame 503a contains proper signaling to help this procedure for some STAs wherein the STA ID is included in NDP Announcement frame 503a.

Referring to (b) of FIG. 5, the beamformed transmission is initiated with a NDP Announcement frame 503b by the beamformer 501b. After SIFS 505b interval, the NDP frame 504b is transmitted to be estimated for channel matrix by for the beamformees 502b (beamformee 1, beamformee 2, . . . beamformee n) and beamformees 502b calculate the beam matrix. After SIFS 505b, the beamforming report poll (BFRP) Trigger frames 507b followed by Compressed Beamforming/CQI frames 506b (Compressed Beamforming/CQI frame 1, Compressed Beamforming/CQI frame 2, . . . Compressed Beamforming/CQI frame n) from a plurality of beamformees 502b are exchanged one or more times. NDP Announcement frame 503b contains proper signaling to help this procedure for some STAs wherein the STA ID is included in NDP Announcement frame 503b.

Figure 6:
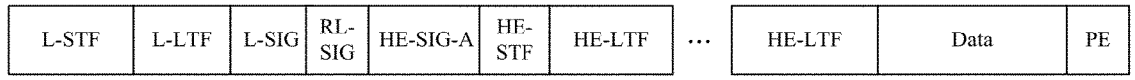
FIG. 6 illustrates an example of HE PPDU format according to an embodiment of the present disclosure.
Figure 6:
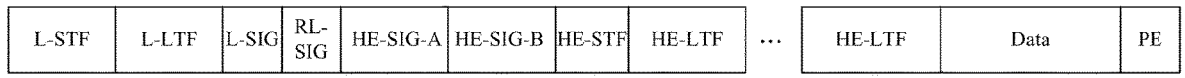
Figure 6:
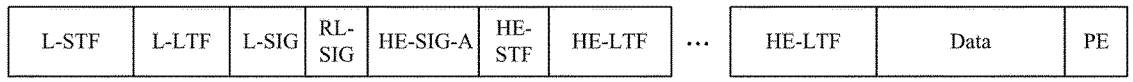
Figure 6:
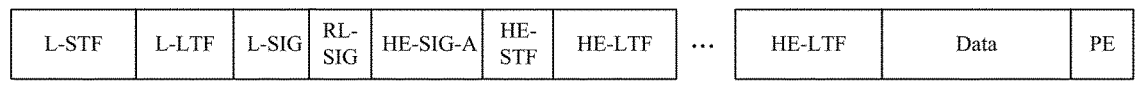

FIG. 6 illustrates an example of HE PPDU format according to an embodiment of the present disclosure.

Referring to FIG. 6, in HE WLAN, the four HE PPDU formats are defined: HE SU PPDU for single user transmission ((a) of FIG. 6)), HE MU PPDU for multi-user transmission ((b) of FIG. 6)), HE ER SU PPDU for single user to cover extended coverage ((c) of FIG. 6)), and HE TB PPDU for UL multi-user transmission from STAs ((d) of FIG. 6)). The HE PHY supports a discrete Fourier transform (DFT) period of 3.2 us and 12.8 us for the pre-HE modulated fields and the HE modulated fields in an HE PPDU respectively. The HE PHY data subcarrier frequency spacing in a quarter of legacy very high throughput (VHT), HT PHY, which enables HE modulated OFDM symbol to have almost 4 multiples of data subcarriers. The fields of the HE PPDU formats are summarized in Table 1 and the L-STF, L-LTF, L-SIG, RL-SIG, HE-SIG-A, and HE-SIG-B fields are referred to as the Pre-HE modulated fields, while HE-STF, HE-LTF and Data fields are referred to as the HE modulated fields.

TABLE 1

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAL field |
| HE-SIG-A | HE SIGNAL A field |
| HE-SIG-B | HE SIGNAL B field |
| HE-STF | HE Short Training field |
| HE-LTF | HE Long Training field |
| Data | The Data field carrying the PSDU(s) |
| PE | Packet extension field |

Figure 7:
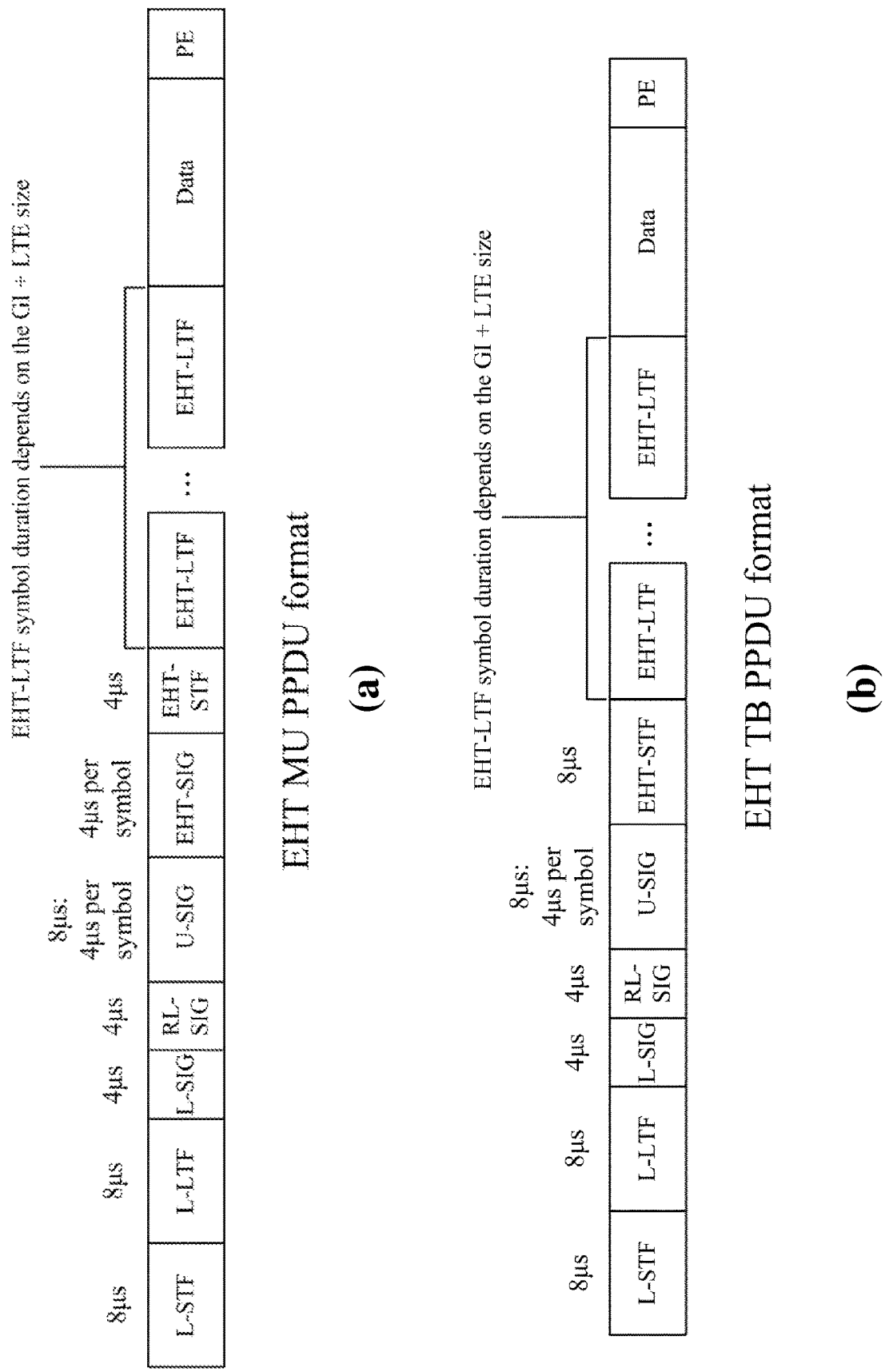
FIG. 7 illustrates an example of EHT PPDU format according to an embodiment of the present disclosure.

FIG. 7 illustrates an example of EHT PPDU format according to an embodiment of the present disclosure.

Referring to FIG. 7, in EHT, two EHT PPDU formats are defined: EHT MU PPDU ((a) of FIG. 7)) and EHT TB PPDU ((b) of FIG. 7)). EHT MU PPDU is used for both single user transmission and multi-user transmission. The EHT MU PPDU is not a response to a triggering frame. In the EHT MU PPDU, the EHT-SIG field is present. EHT TB PPDU is used for a transmission that is a response to a triggering frame from an AP. In the EHT TB PPDU, the EHT-SIG field is not present. The fields of the EHT PPDU formats are summarized in Table 2.

TABLE 2

| Field | Description |
|---|---|
| L-STF | Non-HT Short Training field |
| L-LTF | Non-HT Long Training field |
| L-SIG | Non-HT SIGNAL field |
| RL-SIG | Repeated Non-HT SIGNAL field |
| U-SIG | Universal SIGNAL field |
| EHT-SIG | EHT SIGNAL field |
| EHT-STF | EHT Short Training field |
| EHT-LTF | EHT Long Training field |
| Data | The Data field carrying the PSDU(s) |
| PE | Packet extension field |

The concept of preamble puncturing has been introduced since 11ax. It is a mechanism whereby OFDMA is used to avoid transmissions in certain subcarriers. For PPDU bandwidths greater than or equal to 80 MHz, the HE PHY supports preamble punctured HE MU PPDU transmissions where pre-HE modulated fields (before HE STF field) are not transmitted in one or more of the nonprimary 20 MHz channels, and RUs associated with those punctured 20 MHz channels are not allocated. In HE MU PPDU, there is a field to indicate which subchannels are punctured.

In 11be, preamble puncturing is applicable to OFDMA transmission and non-OFDMA transmission (single user transmission or full bandwidth MU-MIMO transmission). In PHY, the puncturing patterns are defined in the Punctured Channel Information field in EHT MU PPDU. For OFDMA cases, a 4-bit bitmap that tells which 20 MHz subchannel is punctured in the relevant 80 MHz sublock is defined where a value of 0 indicates that the corresponding 20 MHz subchannel is punctured. The allowed punctured patterns are defined for an 80 MHz subblock: 1111, 0111, 1011, 1101, 1110, 0011, 1100, and 1001. Its value could be variable for each 80 MHz subblock when channel operating bandwidth is larger than 80 MHz. For non-OFDMA cases, 5 bit of punctured channel indication is used to signal the non-OFDMA puncturing pattern of the entire PPDU bandwidth as shown in Table 3.

TABLE 3

| PPDU bandwidth | Cases | Puncturing pattern | Field value |
|---|---|---|---|
| 20/40 MHz | No puncturing | [1 1 1 1] | 0 |
| 80 MHz | No puncturing | [1 1 1 1] | 0 |
| | 20 MHz puncturing | [x 1 1 1] | 1 |
| | | [1 x 1 1] | 2 |
| | | [1 1 x 1] | 3 |
| | | [1 1 1 x] | 4 |
| 160 MHz | No puncturing | [1 1 1 1 1 1 1 1] | 0 |
| | 20 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 40 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |

TABLE 3-continued

| PPDU bandwidth | Cases | Puncturing pattern | Field value |
|---|---|---|---|
| 320 MHz | No puncturing | [1 1 1 1 1 1 1 1] | 0 |
| | 40 MHz puncturing | [x 1 1 1 1 1 1 1] | 1 |
| | | [1 x 1 1 1 1 1 1] | 2 |
| | | [1 1 x 1 1 1 1 1] | 3 |
| | | [1 1 1 x 1 1 1 1] | 4 |
| | | [1 1 1 1 x 1 1 1] | 5 |
| | | [1 1 1 1 1 x 1 1] | 6 |
| | | [1 1 1 1 1 1 x 1] | 7 |
| | | [1 1 1 1 1 1 1 x] | 8 |
| | 80 MHz puncturing | [x x 1 1 1 1 1 1] | 9 |
| | | [1 1 x x 1 1 1 1] | 10 |
| | | [1 1 1 1 x x 1 1] | 11 |
| | | [1 1 1 1 1 1 x x] | 12 |
| | 320-80-40 | [x x x 1 1 1 1 1] | 13 |
| | | [x x 1 x 1 1 1 1] | 14 |
| | | [x x 1 1 x 1 1 1] | 15 |
| | | [x x 1 1 1 x 1 1] | 16 |
| | | [x x 1 1 1 1 x 1] | 17 |
| | | [x x 1 1 1 1 1 x] | 18 |
| | | [x 1 1 1 1 1 x x] | 19 |
| | | [1 x 1 1 1 1 x x] | 20 |
| | | [1 1 x 1 1 1 x x] | 21 |
| | | [1 1 1 x 1 1 x x] | 22 |
| | | [1 1 1 1 x 1 x x] | 23 |
| | | [1 1 1 1 1 x x x] | 24 |

Note that in the puncturing patterns in Table 3 above, a "1" denotes a non-punctured subchannel and an "x" denotes a punctured subchannel. The puncturing granularity for 80 MHz and 160 MHz PPDU bandwidth is 20 MHz, and the puncturing granularity for 320 MHz PPDU bandwidth is 40 MHz.

Moreover, given broader channel bandwidth (up to 160 MHz in 11ac, and up to 320 MHz in 11be) for new amendments, this preamble puncturing has been applicable to non-HT duplicate transmission wherein non-HT PPDU is duplicated every 20 MHz subchannels except for the 20 MHz subchannels to be punctured. To indicate which 20 MHz subchannels are punctured, the parameter INACTIVE_SUBCHANNELS are defined to be set by MAC through TXVECTOR parameters because non-HT PPDU does not have enough space to include those indication.

Therefore, there are some methods on which 20 MHz subchannels are punctured. The first way is to use the parameter INACTIVE_SUBCHANNELS wherein this indication of which 20 MHz subchannels are punctured can be conveyed from the MAC to PHY.

<HE Preamble Puncturing Operation>

In legacy 11ax, the parameter INACTIVE_SUBCHANNELS may be present in the TXVECTOR of a non-HT duplicate PPDU that carries an HE NDP Announcement frame or of an HE sounding PPDU. The parameter INACTIVE_SUBCHANNELS is an 8-bit bitmap with an encoding that is the same as the encoding for the Disallowed Subchannel Bitmap subfield defined in NDP Announcement frame wherein each bit matches each 20 MHz subchannel starting from low frequency to cover 160 MHz channel bandwidth.

In legacy 11ax, if an HE AP transmits an HE NDP Announcement frame in a PPDU with punctured channels, then the TXVECTOR parameters FORMAT, NON_HT_MODULATION, CH_BANDWIDTH and INACTIVE_SUBCHANNELS shall be set as follows, which is called as first indication set.

The TXVECTOR parameter FORMAT shall be set to NON_HT.

The TXVECTOR parameter NON_HT_MODULATION shall be set to NON_HT_DUP_OFDM.

The INACTIVE_SUBCHANNELS parameter may have any value, except that the bit in the bitmap representing the primary 20 MHz subchannel shall be set to 0.

The CH_BANDWIDTH parameter value shall be set to CBW80 if there are no bits set to 0 in the INACTIVE_SUBCHANNELS bitmap that correspond to any 20 MHz subchannel of the secondary 80 MHz channel and at least one bit set to 0 that corresponds to any 20 MHz subchannel of the secondary 40 MHz channel.

The CH_BANDWIDTH parameter value shall be set to CBW160 if there is at least one bit set to 0 in the INACTIVE_SUBCHANNELS bitmap that corresponds to any 20 MHz subchannel of the secondary 80 MHz channel.

However, regardless of definition above, there is another definition in legacy 11ax when FORMAT is equal to NON_HT and NON_HT_MODULATION is equal to NON_HT_DUP_OFDM as below, which is called as second indication set.

For 80 MHz channel bandwidth, the bit corresponding to the primary 20 MHz channel set to 0 and two other bits set to 0 that correspond to any other subchannels in the primary 80 MHz channel, all other bits set to 1.

For 160 MHz channel bandwidth, either the bit corresponding to the secondary 20 MHz channel or zero, one or both bits corresponding to the secondary 40 MHz channel set to 1. Zero to two bits corresponding to 20 MHz subchannels in the secondary 80 MHz channel set to 1. All other bits set to 0. Not all bits set to 0. If two bits corresponding to 20 MHz subchannels in the secondary 80 MHz channel are set to 1 these correspond to the lower two or higher two 20 MHz subchannels. No more than two bits corresponding to adjacent 20 MHz subchannels set to 1.

The values setting to 1 mean its corresponding 20 MHz subchannel is punctured. Those puncturing patterns are working based on the bandwidth field in HE-SIG-A of HE MU PPDU wherein some of states in this field indicates the puncturing pattens.

With the same parameter INACTIVE_SUBCHANNEL support different puncturing patterns, this causes the discrepancy between different part of the specification of legacy 11ax. For an example of 160 MHz channel, the first indication set allows more puncturing patterns comparing to the second indication set. Given this different description, it seems unclear which subchannels are punctured.

Therefore, the present disclosure provides some emboidemnts to make it clear for the specification of legacy flax.

The first emboidment is to operate this puncturing function separately for non-HT duplicate PPDU and HE PPDU because the parameter INACTIVE_SUBCHANNEL may be present in non-HT duplicate PPDU of NDP Announcement frame. The specification of amended 11ax should clarify this explicitly.

For example, the parameter INACTIVE_SUBCHANNEL could set the values which the second indication set does not support in PHY preamble when considering the puncturing patterns.

The second embodiemntis that the parameter of INACTIVE_SUBCHANNELS should be set with the same puncturing patterns defined in the Bandwidth field in HE-SIG-A of HE MU PPDU as shown in Table 4 below. It is obvious that the pucturing patterns defined in the Bandwidth filed in HE-SIG-A of HE MU PPDU correspond to the puncturing patterns defined in the second indication set.

For example, if the HE AP transmits an HE NDP Announcement frame in the PPDU with punctured channels, then the TXVECTOR parameters FORMAT, NON_HT_MODULATION, CH_BANDWIDTH and INACTIVE_SUBCHANNELS shall be set as follows.

The TXVECTOR parameter FORMAT shall be set to NON_HT.

The TXVECTOR parameter NON_HT_MODULATION shall be set to NON_HT_DUP_OFDM.

The CH_BANDWIDTH parameter value shall be set to CBW80 if the bit corresponding to the primary 20 MHz channel set to 0 and two other bits set to 0 that correspond to any other subchannels in the primary 80 MHz channel, all other bits set to 1.

The CH_BANDWIDTH parameter value shall be set to CBW160 if either the bit corresponding to the secondary 20 MHz channel or zero, one or both bits corresponding to the secondary 40 MHz channel set to 1. Zero to two bits corresponding to 20 MHz subchannels in the secondary 80 MHz channel set to 1. All other bits set to 0. Not all bits set to 0. If two bits corresponding to 20 MHz subchannels in the secondary 80 MHz channel are set to 1 these correspond to the lower two or higher two 20 MHz subchannels. No more than two bits corresponding to adjacent 20 MHz subchannels set to 1.

TABLE 4

| Two Pars of HE-SIG-A | Bit | Field | Number of bits | Description |
|---|---|---|---|---|
| HE-SIG-A1 | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the HE-SIG-B Compression field is 0: Set to 4 for preamble puncturing in 80 MHz, where in the preamble the only punctured subchannel is the secondary 20 MHz channel. Set to 5 for preamble puncturing in 80 MHz, where in the preamble the only punctured subchannel is one of the two 20 MHz subchannels in secondary 40 MHz channel. Set to 6 for preamble puncturing in 160 MHz or 80 + 80 MHz, where in the preamble the only punctured subchannels are the secondary 20 MHz channel and zero to two of the 20 MHz subchannels in the secondary 80 MHz channel. If two of the 20 MHz subchannels in the secondary 80 MHz channel are punctured, |

TABLE 4-continued

| Two Pars of HE-SIG-A | Bit | Field | Number of bits | Description |
|---|---|---|---|---|
| | | | | these are either the lower two or the higher two. No more than two adjacent 20 MHz subchannels are punctured across 160 MHz. Set to 7 for preamble puncturing in 160 MHz or 80 + 80 MHz, where in the preamble the only punctured subchannels are zero, one or both of the 20 MHz subchannels in the secondary 40 MHz channel and zero to two of the 20 MHz subchannels in the secondary 80 MHz channel; at least one 20 MHz subchannel is punctured. If two of the 20 MHz subchannels in the secondary 80 MHz channel are punctured, these are either the lower two or the higher two. No more than two adjacent 20 MHz subchannels are punctured across 160 MHz. If the HE-SIG-B Compression field is 1 then values 4-7 are reserved. |

<EHT Preamble Puncturing Operation>

In 11be, preamble puncturing is appliable to different type of frames. The indication of which subchannels are punctured in a control (e.g., RTS, MU-RTS Trigger, CTS or etc), data or management frame that is carried in a non-HT duplicate PPDU can be conveyed from the MAC to the PHY through the TXVECTOR parameter INACTIVE_SUB-CHANNELS. The parameter INACTIVE_SUBCHAN-NELS may be present in the TXVECTOR of a non-HT duplicate PPDU or EHT PPDU that carries a control, data or management frame. Given 11be supporting up to 320 MHz channel bandwidth, size of the parameter INACTIVE_SUB-CHANNELS should be 16 bits. For the new amendments, the basic assumption is that now the parameter INACTIVE_SUBCHANNELS could be used in not only non-HT duplicate PPDU but also EHT PPDU. And puncturing pattern signaling is not limited to NDP Announcement frame or NDP frame.

Given at least two different types of indication being defined, there is need to set up a rule. On top of that, the indication could be dynamic or static.

Figure 8:
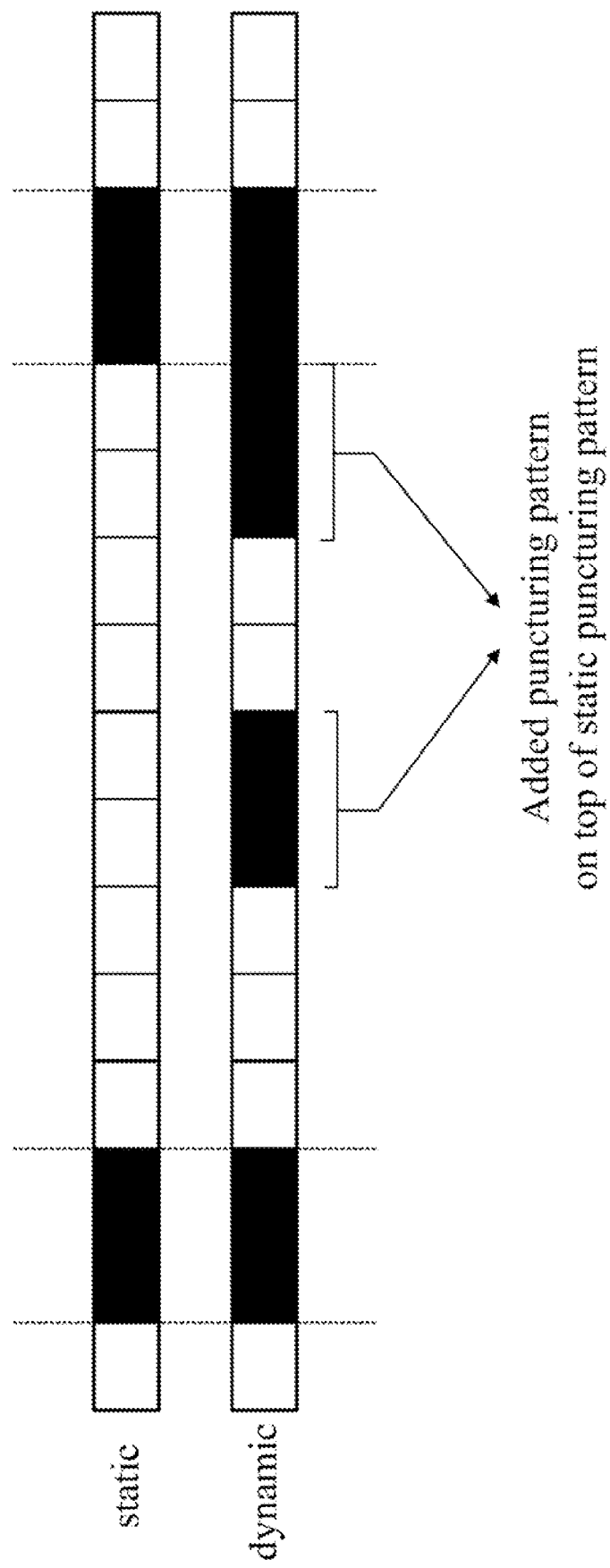
FIG. 8 illustrates different types of indication according to an embodiment of the present disclosure.

FIG. 8 illustrates different types of indication according to an embodiment of the present disclosure.

Referring to FIG. 8, a static puncturing channel indication is likely to reflect the local regulation and channel characteristics which do not allow some specific channels for the BSS. It means at least those channels are likely to be punctured for a relatively long time. For example, the static puncturing channel indication could be provided with the EHT Operation element as shown in FIG. 8 below wherein this element could be carried in a management frame such as a beacon frame. Once the management frame including the static puncturing channel indication is received, the puncturing pattern for the static puncturing channel indication could be used unless additional indication (e.g., the dynamic puncturing channel indication or another static puncturing channel indication) is not correctly received. On the other hand, the dynamic puncturing indication could be dynamically updated in accordance with the channel measurement depending on the circumstances. For example, the dynamic puncturing indication should contain the static puncturing pattern.

Figure 9:
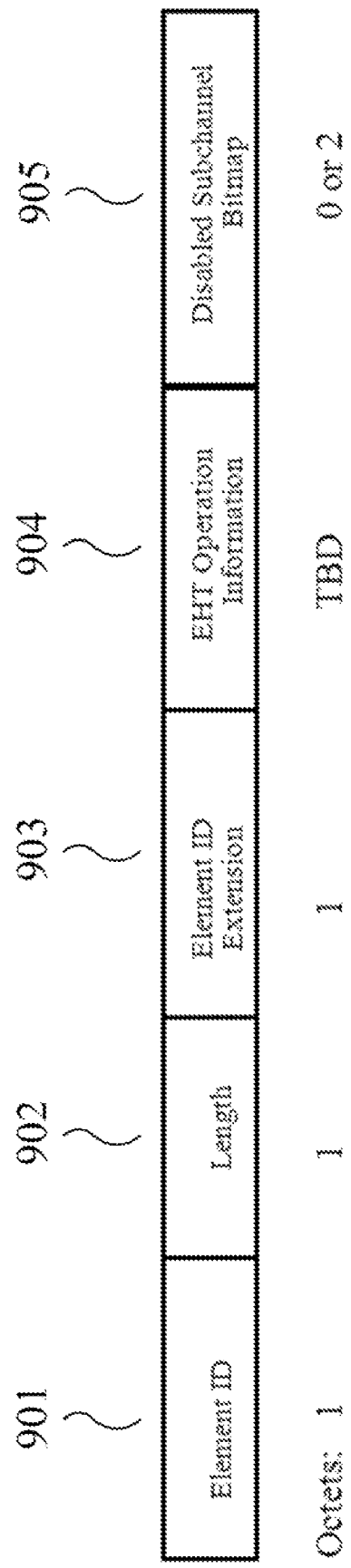
FIG. 9 illustrates the format of the operation element including the static puncturing channel indication according to an embodiment of the present disclosure.

FIG. 9 illustrates the format of the EHT Operation element according to an embodiment of the present disclosure.

Referring to FIG. 9, the format of the EHT Operation element 900 includes Element ID field 901, Length field 902, Element ID Extension filed 903, EHT Operation Information field 904 and Disabled Subchannel Bitmap field 905. The EHT Operation element is identified by the Element ID field 901 and, if present, the Element ID Extension field 904. The Length field 902 indicates the number of octets in the EHT Operation element excluding the Element ID field 901 and the Length field 902. The subfields of the EHT Operation information field 904 are defined in Table 5. Referring to Table 5, the EHT Operation information field 904 includes Channel Width subfield, channel center frequency segment (CCFS) information field, and Disabled Subchannel Bitmap Presnet subfield. The Channel Width subfield indicates the EHT BSS channel width set to 0 for 20 MHz, 1 for 40 MHz, 2 for 80 MHz, 3 for 160 MHz, and 4 for 320 MHz and CCFS information subfield indicates the channel center frequency for a 20, 40, 80, 160 or 320 MHz EHT BSS. The Disabled Subchannel Bitmap Present subfield indicates whether the Disabled Subchannel Bitmap filed 905 is present. For example, the Disabled Subchannel Bitmap field 905 is present if the Disabled Subchannel Bitmap Present subfield is 1, otherwise, the Disabled Subchannel Bitmap field 905 is not present. The Disabled Subchannel Bitmap field 905 provides the static puncturing channel indication indicating a list of subchannels that are punctured within the BSS bandwidth, if present.

TABLE 5

| Subfield | Definition | Encoding |
|---|---|---|
| Channel Width | This field defines the EHT BSS bandwidth. | Set to 0 for 20 MHz EHT BSS bandwidth. Set to 1 for 40 MHz EHT BSS bandwidth. Set to 2 for 80 MHz EHT BSS bandwidth. Set to 3 for 160 MHz EHT BSS bandwidth. Set to 4 for 320 MHz EHT BSS bandwidth. Other values are reserved. |
| CCFS | TBD | TBD |
| Disabled Subchannel Bitmap Present | Indicates whether the Disabled Subchannel Bitmap field is present or not. | Set to 1 if the Disabled Subchannel Bitmap field is present; set to 0 otherwise. |

When static puncturing channel indication is received with a first puncturing pattern, a second puncturing pattern should be reset wherein the second puncturing pattern could be provided through a static puncturing channel indication or dynamic puncturing channel indication. What to indicate for static or dynamic puncturing channel indication should include all the embodiments mentioned in the present disclosure.

For example, the dynamic puncturing channel indication could be signaling in SIG field wherein the puncturing patterns could be changed every PPDU transmission. For example, the dynamic puncturing channel indication could be signaling in the parameter INACTIVE_SUBCHANNELS in case its values could be updated whenever the PPDUs are transmitted if required. For example, puncturing patterns could be signaling from either PHY preamble or TXVECTOR parameter such as INACTIVE_SUBCHNNELS. The puncturing patterns could be either non-OFDMA or OFDMA puncturing signaling based on PHY preamble in EHT MU PPDU or could be signaling with 1-bit PS160 subfield and 8-bit RU allocation subfield in Trigger frame. The those puncturing patterns could be carried in non-HT frame, 11ax frame or 11be frame. Here, the puncturing pattern is not limited to the dynamic puncturing channel indication but allowed for static puncturing channel indication. Even if some of the puncturing patterns are missed from the present disclosure below, it is natural to include all the embodiments mentioned in the present disclosure, and all or some of the embodiments below could be used together.

The first embodiment is that all the frames in non-HT PPDU and EHT PPDU could use a first puncturing pattern.

For example, the first puncturing pattern could be defined in PHY preamble.

In 11be, its puncturing pattern are two types in non-OFDMA puncturing pattern and OFDMA puncturing pattern.

For example, the first puncturing pattern could use non-OFDMA puncturing pattern only.

For example, the first puncturing pattern could use OFDMA puncturing pattern only.

For example, the first puncturing pattern could use both OFDMA puncturing pattern and non-OFDMA puncturing pattern.

For example, parameter INACTIVE_SUBCHANNELS can reuse the first puncturing pattern defined in PHY preamble above.

For example, Disabled Subchannel Bitmap field can reuse the first puncturing pattern defined in PHY preamble above.

The second embodiment is that some specific frame could use a first puncturing pattern. Otherwise, use a second puncturing pattern.

The first puncturing pattern could be designed as much as flexible. For example, only primary 20 MHz subchannel is not punctured and any 20 MHz subchannels could be punctured while keeping the channel bandwidth.

The first puncturing pattern could reuse the one defined in EHT NDP Announcement frame wherein the one is 9 bit of partial BW Info subfield consisting of B0 to inform whether it is 20 MHz or 40 MHz resolution for following each bit and B1 to B8 to inform the feedback bitmap as shown in Table 6.

TABLE 6

| Operating channel width of the EHT beamformee (MHz) | Bandwidth of EHT NDP Announcement frame | Feedback RU/MRU Size | Partial BW Info subfield values |
|---|---|---|---|
| 20, 40, 80, 160, 320 | 20 MHz | 242 | 010000000 |
| 20, 40, 80, 160, 320 | 40 MHz | 242 | 010000000, 001000000 |
| | | 484 | 011000000 |
| 20, 80, 160, 320 | 80 MHz | 242 | 010000000, 001000000, 000100000, 000010000 |
| | | 484 | 011000000, 000110000 |
| | | 484 + 242 | 011100000, 011010000, 010110000, 001110000 |
| | | 996 | 011110000 |
| 20, 80, 160, 320 | 160 MHz | 242 | 010000000, 001000000, 000100000, 000010000, 000001000, 000000100, 000000010, 000000001 |
| | | 484 | 011000000, 000110000, 000001100, 000000011 |
| | | 484 + 242 | 011100000, 011010000, 010110000, 001110000, 000001110, 000001101, 000001011, 000000111 |
| | | 996 | 011110000, 000001111 |
| | | 996 + 484 | 011111100, 011110011, 011001111, 000111111 |
| | | 996 + 484 + 242 | 011101111, 011011111, 010111111, 001111111, 011111110, 011111101, 011111011, 011110111 |
| | | 2 × 996 | 011111111 |
| 80, 160, 320 | 320 MHz | 484 | 110000000, 101000000, 100100000, 100010000, 100001000, 100000100, 100000010, 100000001 |
| | | 996 | 111000000, 100110000, 100001100, 100000011 |
| | | 996 + 484 | 111100000, 111010000, 110110000, 101110000, 100001110, 100001101, 100001011, 100000111 |
| | | 2 × 996 | 111110000, 100001111, |
| | | 2 × 996 + 484 | 111111000, 111110100, 111101100, 111011100, 110111100, 101111100, 100111110, 100111101, 100111011, 100110111, 100101111, 100011111 |
| | | 3 × 996 | 111111100, 111110011, 111001111, 100111111 |
| | | 3 × 996 + 484 | 111111110, 111111101, 111111011, 111110111, 111101111, 111011111, 110111111, 101111111 |
| | | 4 × 996 | 111111111 |

The first puncturing pattern could be signaling in the parameter INACTIVE_SUBCHANNELS.

The specific frame could be defined one or more frame such as CTS, PS-Poll frames.

The specific frame could be EHT frame wherein the PHY preamble carries puncturing pattern information.

The first puncturing pattern could be indicated by puncturing pattern information defined in PHY preamble.

Even though the puncturing pattern which was correctly received is given with the second puncturing pattern (such as patterns in the parameter INACTIVE_SUBCHANNEL or patterns in Operation element), the recently received first puncturing patterns should be used.

The third embodiment is that a first puncturing pattern is used in non-HT PPDU and a second puncturing pattern is used in EHT PPDU wherein the second puncturing patten is carried in PHY preamble such as U-SIG. The first one could more relaxed patterns to open more possible puncturing patterns.

Depending on the frames carrying the first puncturing patterns, it could be differently defined. For example, the puncturing pattern to be applied to CTS frame could be different with the puncturing pattens to be used for other types of non-HT or non-HT duplicate frame.

The fourth embodiment is that a first puncturing information could be used for all types of frame during a specific period (e.g. TXOP, or service period). For example, the first puncturing information could be indicated based on the puncturing patterns defined in PHY SIG. For example, the first puncturing information could be indicated by the parameter INACTIVE_SUBCHANNEL or the Operation element. When EHT-PPDU is transmitted, the puncturing pattens in SIG could be set with disregard state. For example, starting the service period with some specific frame such as Trigger frame, or TWT frame, its puncturing patterns could be used for all the frames in the specific period.

The fifth embodiment is that when a first puncturing pattern is correctly received, the first puncturing pattern could override the second puncturing pattern. That means the puncturing pattern recently received shall be used for the next frame exchanges.

For example, the first puncturing pattern could be signaling in PHY preamble. The second puncturing pattern could be indicated with the Operation element or parameter INACTIVE_SUBCHANNELS.

For example, the first puncturing pattern could be signaling in the parameter INACTIVE_SUBCHANNELS and the second puncturing pattern could be signaling in the Operation element.

For example, the first puncturing pattern could be the indication as dynamic signal (e.g., dynamic puncturing channel indication) and the second puncturing pattern could be the indication as static signal (e.g., static puncturing channel indication) or as dynamic signal (e.g., dynamic puncturing channel indication).

The dynamic signal could be signaling in PHY preamble.

The dynamic signal could be signaling in the parameter INACTIVE_SUBCHANNELS.

The static signal could be signaling in the Operation element.

There are EHT MU PPDU and EHT TB PPDU. EHT MU PPDU carries the Punctured Channel Information in U-SIG to indicate which 20 MHz subchannels are punctured to a single user transmission and a multiple user transmission (Full (or partial) bandwidth MU-MIMO transmission or OFDMA transmission). EHT TB PPDU carries no such information because it is supposed to be responded in Trigger frame wherein PS160 and RU allocation subfields indicate jointly the assigned location for each user as shown in Table 7. In EHT MU PPDU, the parameter INACTIVE_SUBCHANNELS could be selected from the punctured channel information in U-SIG. If the puncturing patterns in the parameter INACTIVE_SUBCHANNELS is different from the puncturing patten in PHY preamble, all the 20 MHz subchannels which are punctured should be punctured. If the puncturing patterns in the parameter INACTIVE SUB CHANNELS is different from the puncturing patten in PHY preamble, the 20 MHZ subchannels from the dynamic puncturing channel indication should be punctured. Since EHT TB PPDU is a response frame to the Trigger frame which include RU allocation subfield (or puncturing information), the parameter INACTIVE_SUBCHANNEL is not present.

TABLE 7

| PS160 subfield | B0 of the RU Allocation subfield | B7-B1 of the RU Allocation subfield | Bandwidth (MHz) | RU/MRU size | RU/MRU index | PHY RU/MRU index |
|---|---|---|---|---|---|---|
| 80 MHz segment where the RU is located | 0-3: | 0-8 | 20, 40, 80, 160, or 320 | 26 | RU1 to RU9, respectively | 37 × N + RU index |
| | | 9-17 | 40, 80, 160, or 320 | | RU10 to RU18, respectively | |
| | | 18 | 80, 160, or 320 | | Reserved | |
| | | 19-36 | 80, 160, or 320 | | RU20 to RU37 respectively | |
| | | 37-40 | 20, 40, 80, 160, or 320 | 52 | RU1 to RU4, respectively | 16 × N + RU index |
| | | 41-44 | 40, 80, 160, or 320 | | RU5 to RU8, respectively | |
| | | 45-52 | 80, 160, or 320 | | RU9 to RU16, respectively | |
| | | 53, 54 | 20, 40, 80, 160, or 320 | 106 | RU1 and RU2, respectively | 8 × N + RU index |
| | | 55, 56 | 40, 80, 160, or 320 | | RU3 and RU4, respectively | |
| | | 57-60 | 80, 160, or 320 | | RU5 to RU8, respectively | |

TABLE 7-continued

| PS160 subfield | B0 of the RU Allocation subfield | B7-B1 of the RU Allocation subfield | Bandwidth (MHz) | RU/MRU size | RU/MRU index | PHY RU/MRU index |
|---|---|---|---|---|---|---|
| | | 61 | 20, 40, 80, 160, or 320 | 242 | RU1 | 4 × N + RU index |
| | | 62 | 40, 80, 160, or 320 | | RU2 | |
| | | 63, 64 | 80, 160, or 320 | | RU3 and RU4, respectively | |
| | | 65 | 40, 80, 160, or 320 | 484 | RU1 | 2 × N + RU index |
| | | 66 | 80, 160, or 320 | | RU2 | |
| | | 67 | 80, 160, or 320 | 996 | RU1 | N + RU index |
| 0-1: 160 MHz segment where the RU is located | 0 | 68 | | Reserved | | Reserved |
| | 1 | | 160 or 320 | 2 × 996 | RU1 | X1 + RU index |
| 0 | 0 | 69 | | Reserved | | Reserved |
| 0 | 1 | | | | | |
| 1 | 0 | | | | | |
| 1 | 1 | | 320 | 4 × 996 | RU1 | RU1 |
| | 0-3: 80 MHz segment where the RU is located | 70-72 | 20, 40, 80, 160, or 320 | 52 + 26 | MRU1 to MRU3, respectively | 12 × N + MRU index |
| | | 73-75 | 40, 80, 160, or 320 | 52 + 26 | MRU4 to MRU6, respectively | |
| | | 76-81 | 80, 160, or 320 | 52 + 26 | MRU7 to MRU12, respectively | |
| | | 82, 83 | 20, 40, 80, 160, or 320 | 106 + 26 | MRU1 and MRU2, respectively | 8 × N + MRU index |
| | | 84, 85 | 40, 80, 160, or 320 | 106 + 26 | MRU3 and MRU4, respectively | |
| | | 86-89 | 80, 160, or 320 | 106 + 26 | MRU5 to MRU8, respectively | |
| | | 90-93 | 80, 160, or 320 | 484 + 242 | MRU1 to MRU4, respectively | 4 × N + MRU index |
| 0-1: 160 MHz segment where the MRU is located | 0 | 94, 95 | 160 or 320 | 996 + 484 | MRU1 and MRU2, respectively | 4 × X1 + MRU index |
| | 1 | | | | MRU3 and MRU4, respectively | |
| 0-1: 160 MHz segment where the MRU is located | 0 | 96-99 | 160 or 320 | 996 + 484 + 242 | MRU1 to MRU4, respectively | 8 × X1 + MRU index |
| | 1 | | | | MRU5 to MRU8, respectively | |
| 0 | 0 | 100-103 | 320 | 2 × 996 + 484 | MRU1 to MRU4, respectively | MRU index |
| 0 | 1 | | | | MRU5 and MRU6, respectively | |
| 1 | 0 | | | | MRU7 and MRU8, respectively | |
| 1 | 1 | | | | MRU9 to MRU12, respectively | |
| 0 | 0 | 104 | 320 | 3 × 996 | MRU1 | MRU index |
| 0 | 1 | | | | MRU2 | |
| 1 | 0 | | | | MRU3 | |
| 1 | 1 | | | | MRU4 | |
| 0 | 0 | 105, 106 | 320 | 3 × 996 + 484 | MRU1 and MRU2, respectively | MRU index |
| 0 | 1 | | | | MRU3 and MRU4, respectively | |
| 1 | 0 | | | | MRU5 and MRU6, respectively | |
| 1 | 1 | | | | MRU7 and MRU8, respectively | |
| Any | Any | 107-127 | Any | Reserved | Reserved | Reserved |

NOTE-
B0 of the RU Allocation subfield is set to 0 to indicate that the RU/MRU allocation applies to the primary 80 MHz channel and set to 1 to indicate that the RU allocation applies to the secondary 80 MHz channel in the primary 160 MHz. B0 of the RU Allocation subfield is set to 0 to indicate that the RU/MRU allocation applies to the lower 80 MHz in the secondary 160 MHz and is set to 1 to indicate that the RU allocation applies to upper 80 MHz in the secondary 160 MHz.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a transmitter in a wireless local area network (WLAN), the method comprising:
setting a second parameter in a second frame based on a first puncturing pattern indicated by a first parameter in a first frame for a basic service set (BSS) set up by an extreme high throughput (EHT) access point (AP); and
transmitting, to a receiver, the second frame,
wherein the first puncturing pattern is one of a plurality of puncturing patterns pre-determined for a third parameter in a third frame,
wherein the plurality of the pre-determined puncturing patterns includes a plurality of non-orthogonal frequency division multiplexing access (non-OFDMA) puncturing patterns, and
wherein a type of the third frame includes EHT multi-user (MU) PPDU frame, and
wherein the third parameter includes punctured channel information included in a universal signal (U-SIG) field in the third frame,
wherein the first puncturing pattern is most recently exchanged puncturing pattern.

2. The method of claim 1, wherein the transmitter is one of the EHT AP or a EHT station (STA), and
wherein if the transmitter is the EHT AP, the receiver is the EHT STA, and
wherein if the transmitter is the EHT STA, the receiver is the EHT AP.

3. The method of claim 2, wherein a type of the first frame includes a beacon frame, and wherein the first parameter includes a disabled subchannel bitmap field included in operation element in the first frame.

4. The method of claim 2, wherein a type of the second frame includes one of an EHT physical layer protocol data unit (PPDU) frame or a non-high throughput (HT) duplicate PPDU frame, and
wherein the second parameter includes a parameter INACTIVE_SUBCHANNELS of the second frame.

5. The method of claim 2, further comprising:
transmitting, to the receiver, a fourth frame including a fourth parameter indicating a second puncturing pattern,
wherein the second puncturing pattern indicates at least one 20 MHz subchannel to be punctured for a channel bandwidth of the BSS, and
wherein the at least one 20 MHz subchannel is not punctured by the first puncturing pattern.

6. The method of claim 5, wherein a type of the fourth frame includes an MU EHT PPDU frame, and
wherein the fourth parameter includes punctured channel information included in a U-SIG field in the fourth frame, and
wherein a type of the second puncturing pattern is one of a OFDMA puncturing pattern or a non-OFDMA puncturing pattern.

7. The method of claim 5, wherein a type of the fourth frame includes a trigger frame, and
wherein the fourth parameter includes primary/secondary (PS)160 field and resource unit (RU) allocation field in the fourth frame.

8. The method of claim 4, wherein the transmitting of the second frame comprises:
when the type of the second frame includes one of an EHT MU PPDU or the non-HT duplicate PPDU, transmitting, to the receiver, the second frame indicating the first puncturing pattern during a transmit opportunity (TXOP) with a specific condition.

9. A transmitter in a wireless local area network (WLAN), the transmitter comprising:
a transceiver; and
a processor configured to:
set a second parameter in a second frame based on a first puncturing pattern indicated by a first parameter in a first frame for a basic service set (BSS) set up by an extreme high throughput (EHT) access point (AP); and
control the transceiver to transmit, to a receiver, the second frame,
wherein the first puncturing pattern is one of a plurality of pre-determined puncturing patterns indicated by a third parameter in a third frame,
wherein the plurality of the pre-determined puncturing patterns includes a plurality of non-orthogonal frequency division multiplexing access (non-OFDMA) puncturing patterns, and
wherein a type of the third frame includes EHT multi-user (MU) PPDU frame, and
wherein the third parameter includes punctured channel information included in a universal signal (U-SIG) field in the third frame,
wherein the first puncturing pattern is most recently exchanged puncturing pattern.

10. The transmitter of claim 9, wherein the transmitter is one of the EHT AP or a EHT station (STA), and
wherein if the transmitter is the EHT AP, the receiver is the EHT STA, and
wherein if the transmitter is the EHT STA, the receiver is the EHT AP.

11. The transmitter of claim 10, wherein a type of the first frame includes a beacon frame, and wherein the first parameter includes a disabled subchannel bitmap field included in operation element in the first frame.

12. The transmitter of claim 10, wherein a type of the second frame includes one of an EHT physical layer protocol data unit (PPDU) frame or a non-high throughput (HT) duplicate PPDU frame, and
wherein the second parameter includes a parameter INACTIVE_SUBCHANNELS of the second frame.

13. The transmitter of claim 10, wherein the processor is configured to:
control the transceiver to transmit, to the receiver, a fourth frame including a fourth parameter indicating a second puncturing pattern,
wherein the second puncturing pattern indicates at least one 20 MHz subchannel to be punctured for a channel bandwidth of the BSS, and
wherein the at least one 20 MHz subchannel is not punctured by the first puncturing pattern.

14. The transmitter of claim 13, wherein a type of the fourth frame includes an MU EHT PPDU frame, and
wherein the fourth parameter includes punctured channel information included in a U-SIG field in the fourth frame, and wherein a type of the second puncturing pattern is one of a OFDMA puncturing pattern or a non-OFDMA puncturing pattern.

15. The method of claim 13, wherein a type of the fourth frame includes a trigger frame, and
wherein the fourth parameter includes primary/secondary (PS)160 field and resource unit (RU) allocation field in the fourth frame.

16. The method of claim 11, wherein the processor is configured to:
when the type of the second frame includes at least one of an EHT MU PPDU or the non-HT duplicate PPDU, control the transceiver to transmit, to the receiver, the second frame indicating the first puncturing pattern during a transmit opportunity (TXOP) with a specific condition.

* * * * *